(12) United States Patent
Flammang

(10) Patent No.: US 6,757,858 B1
(45) Date of Patent: Jun. 29, 2004

(54) SYSTEM SIGNALING FOR PAYLOAD FAULT DETECTION AND ISOLATION

(75) Inventor: Richard Flammang, Manhattan Beach, CA (US)

(73) Assignee: Hughes Electronics Corp., El Segundo, CA (US)

( * ) Notice: Subject to any disclaimer, the term of this patent is extended or adjusted under 35 U.S.C. 154(b) by 441 days.

(21) Appl. No.: 09/629,030

(22) Filed: Jul. 31, 2000

(51) Int. Cl.⁷ .................. G06F 11/00; G06F 11/30; H03M 13/00; H04L 1/00; G08C 25/00
(52) U.S. Cl. .................. 714/746; 714/755; 370/316
(58) Field of Search .................. 725/67; 714/716, 714/755, 746, 774, 821, 724, 712; 342/354, 357.1; 370/310, 104.1, 316; 455/3.02, 12.1, 13.4

(56) References Cited

U.S. PATENT DOCUMENTS

| | | | | |
|---|---|---|---|---|
| 5,067,672 A | * | 11/1991 | Bouzat | 244/158 R |
| 5,594,490 A | * | 1/1997 | Dawson et al. | 725/67 |
| 5,903,549 A | * | 5/1999 | von der Embse et al. | 370/310 |
| 6,081,227 A | * | 6/2000 | Haber et al. | 342/354 |
| 6,084,541 A | * | 7/2000 | Sayegh | 342/354 |
| 6,263,466 B1 | * | 7/2001 | Hinedi et al. | 714/755 |

* cited by examiner

Primary Examiner—Albert Decady
Assistant Examiner—Mujtaba Chaudry
(74) Attorney, Agent, or Firm—Terje Gudmestad

(57) ABSTRACT

A fault detection system for a satellite communication system includes a satellite positioned above earth. Satellite has a payload that communicates with a network control center on earth. System ground stations generate diagnostic messages and transmits the diagnostic messages to the payload. Each diagnostic message has a predetermined path characteristic so that the diagnostic message takes a predetermined path through the payload, or part of the payload, if the payload is operating properly. Parts of the payload, if any, which do not permit deterministic path tracing using externally applied diagnostic messages may be probed by using internal signal or data injection points. In response to the externally applied or internally injected diagnostic message, a response signal is generated at the payload. The response signal is transmitted to the network control center where it is compared with a predetermined response. When the response signal is different from the predetermined response, a fault signal is generated and corrective measures may be performed.

14 Claims, 2 Drawing Sheets

SYSTEM SIGNALING FOR PAYLOAD FAULT DETECTION AND ISOLATION

TECHNICAL FIELD

The present invention relates generally to communications satellites, and more particularly, to a system for detecting and isolating faults in the payload of a communications satellite.

BACKGROUND ART

In this communication age, content providers are increasingly investigating ways in which to provide more content to users as well as interfacing with users. Communications satellites have become commonplace for use in many types of communication services, e.g., data transfer, voice communications, television spot beam coverage and other data transfer applications. As the amount of data increases, the complexity of the satellite payload has also increased. The latest systems require each signal passing through the payload to undergo many transformations. Signal routing within the payload is highly dynamic, changing in some cases on time scales of tens of microseconds.

Traditional methods of fault detection include additional circuitry used to monitor the functioning of the various portions of the payload. Upon the detection of a fault, the circuitry provides the control center with an indication of the fault. One problem with this approach is that due to the complexity of newer satellite systems, the additional mass, power and cost of such systems is prohibitive. Mass, power and cost are resources that are desirable to reduce in spacecraft design.

SUMMARY OF THE INVENTION

It is therefore an object of the invention to provide a fault detection and isolation system that uses system signaling and thereby reduces the complexity of the satellite payload.

In one aspect of the invention, a fault detection and isolation system for a satellite communications system includes a satellite having a payload with a plurality of switches and electronic component strings having a plurality of paths therethrough. A system ground station generates a diagnostic message corresponding to at least one of the plurality of paths. The ground terminal transmits the diagnostic message to the payload. The payload generates a response signal and transmits the response signal to a control center.

In a further aspect of the invention, a method for detecting and isolating a fault in a satellite communication system includes the steps of:

generating a diagnostic message at a system ground station, said diagnostic message having a predetermined path characteristic relative to the spacecraft payload;

transmitting the diagnostic message to the spacecraft payload;

generating a response signal in the payload in response to the diagnostic message;

transmitting the response signal to a network control center;

comparing the response signal to a predetermined response; and, when the response signal is missing or is different from the predetermined response, generating a fault signal.

One advantage of the invention is that a high level of timely payload fault detection and isolation may be performed while reducing the amount of onboard payload telemetry equipment.

Other objects and features of the present invention will become apparent when viewed in light of the detailed description of the preferred embodiment when taken in conjunction with the attached drawings and appended claims.

BEST MODES FOR CARRYING OUT THE INVENTION

Figure 1:
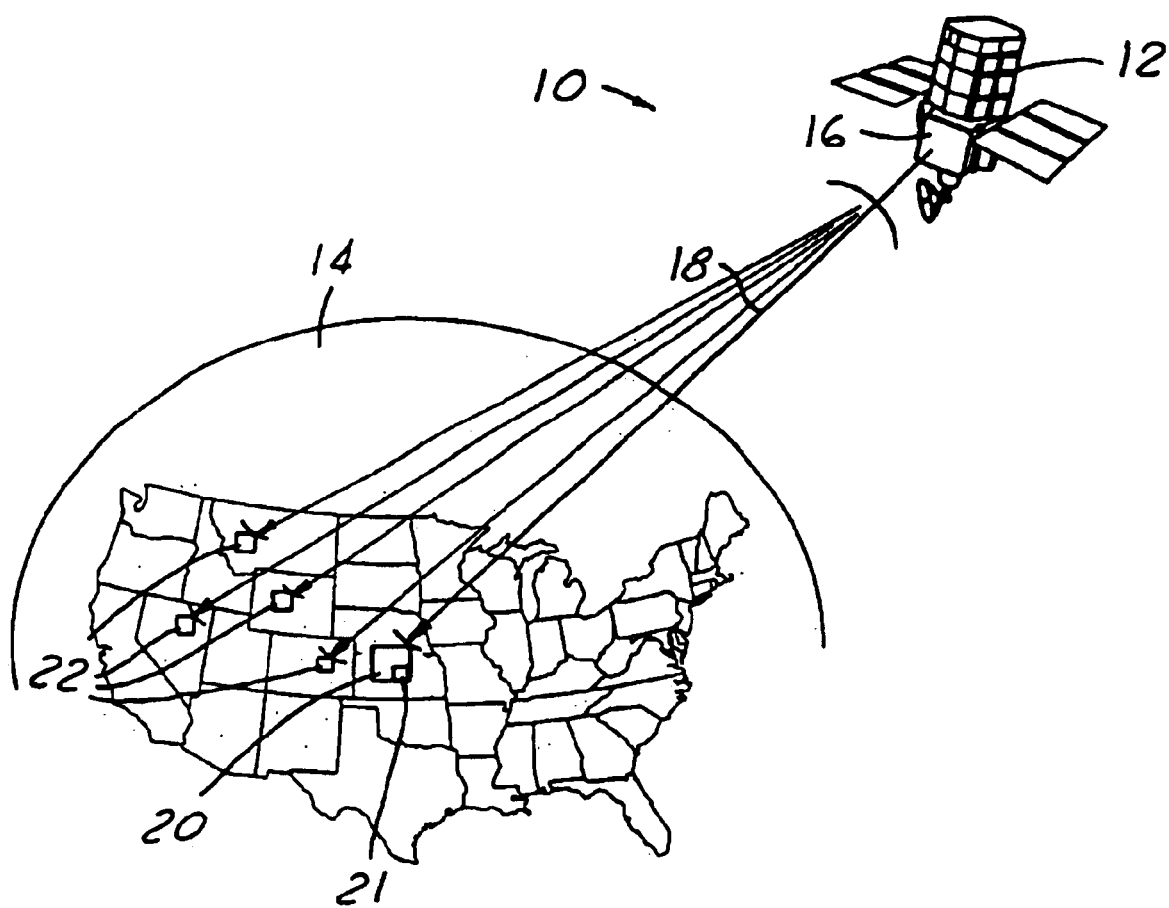
FIG. 1 is a diagrammatic view of a space-based communications network, within which the present invention functions.

In the following figures, the same reference numerals are used to identify the same components in the various views. The present invention is shown with respect to a particular satellite payload. However, the present invention is applicable to various types of satellite payloads.

Referring now to FIG. 1, a satellite communications system 10 includes one or more satellites 12 that orbit above earth 14. Each satellite 12 has a payload 16 thereon that is used to route and transmit various communication signals 18 to and from the earth 14. Earth 14 has a network operation center 20 located on the surface thereof. Network control center 20 may perform many functions including attitude and other spacecraft communication control; it has a fault detection and isolation system 21 for faults in payload 16. As will be further described below, a plurality of system ground stations 22 generate diagnostic messages that are transmitted to satellite 12. Response signals from satellite 12 are received at network control center 20 to determine if a fault exists. Also, the network control center 20, in a fault isolation mode, may determine where in the payload a fault occurs.

Figure 2:
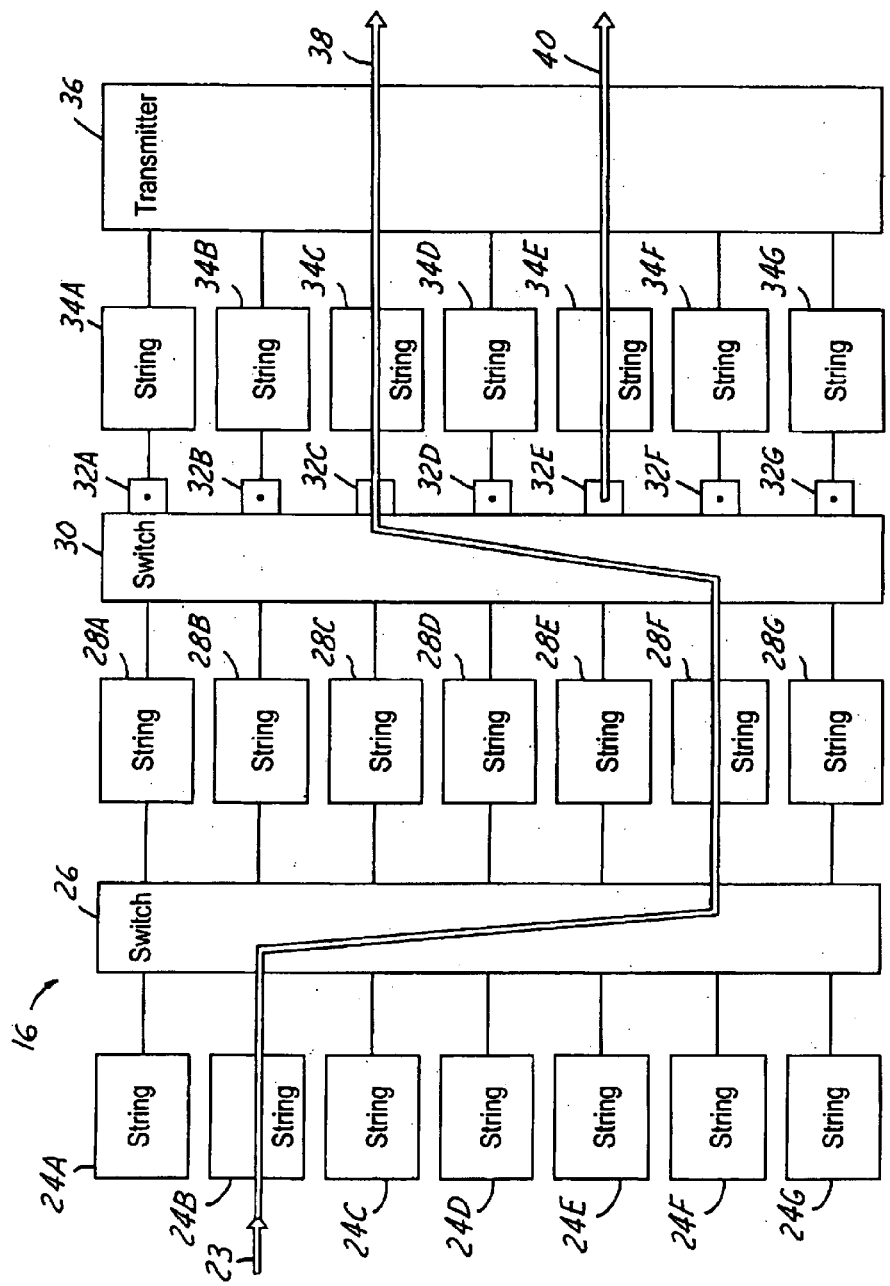
FIG. 2 is a simplified schematic view of a payload undergoing fault detection and isolation according to the present invention.

Referring now to FIG. 2, a generic payload 16 is illustrated in further detail. Payload 16 has a particular configuration as illustrated, however, the present invention is applicable to payloads having various configurations. Payload 16 has a plurality of strings 24A–24G, 28A–28G, 34A–34G. Strings are electronic units that are connected serially. Strings 24A–24G are coupled to switch 26. Switch 26 may comprise conventional switches or data packet switches known to those skilled in the art. Switch 26 is used to route the diagnostic message and the other communication signals. Switch 26 is coupled to a plurality of strings 28A–28G. Strings 28A–28G are also electronic units connected serially. As illustrated, switch 26 routes the diagnostic message from string 24B to string 28F. Strings 28A–28G may also be coupled to a second switch 30. Switch 30 is coupled to a plurality of strings 34A–34G. As shown, switch 30 routes the diagnostic message from string 28F to string 34C. Strings 34A–34G are coupled to a transmitter 36 that is used to transmit a response signal 38 to the network control center 20.

Switch 30 may have a plurality of injection points 32A through 32G. Injection points 32A–32G may be used to inject test messages into payload 16. The injected data acts as a tracer through strings 34A–34G. Also, various injection points 32 may be located at other locations within payload 16 such as adjacent to switch 26. Injection points 32A–32G allow various portions of payload 16 to be tested.

One path is illustrated through payload 16. The path routes signals from string 28B through switch 26 to string 28F to switch 30 through string 34C to transmitter 36. Switches 26 and 30 are preferably electronically controlled according to the desired operation of the satellite. Switches 26, 30 may, for example, be used to route data packets from an incoming beam from one location in the service area of the satellite to another beam in another part of the service area or to an inter-satellite link communicating with another satellite. Thus, as would be evident to those skilled in the art, a plurality of paths through payload 16 may be achieved.

In operation, a diagnostic message 23 is formulated at one of the ground terminals 22. The diagnostic message 23 may contain various characteristics representative of a desired path through the payload 16. The network control center 20 may command the ground terminals to provide a predetermined signal. These characteristics will cause the switches and strings to route the diagnostic message through a predetermined path and have a predetermined response signal 38 if the predetermined path was followed and the components in the path are operating properly. In the preferred embodiment of a properly operating payload, an unchanged diagnostic message is received at the network control center 20. The response signal 38 is transmitted to operations center 20 where it is compared with a predetermined response. If the response signal is missing or is not the same as the predetermined response, then a fault signal may be generated at the network control center 20 to determine that a fault has occurred. Also, by reviewing the response signal, if it is not the same as the diagnostic message, an indication as to the location of the fault may be determined. Also, by employing a plurality of test paths, the fault can be isolated to a particular string or to a particular part of a switch. Corrections may be made from the Network Control Center 20 to correct the error or to route signals around the error. Also, a tracer signal may be injected at various locations into payload 16. As illustrated, tracer 40 is injected after switch 30 at injection point 32E. By monitoring tracer signal 40, the operation of circuitry through the tracer signal path may be verified. The tracer signal has a predetermined format and thus a predetermined output will be obtained. The tracer signal is transmitted to the network control center and it can be compared with a predetermined signal to determine if the circuitry from the injection point forward is operating properly.

While particular embodiments of the invention have been shown and described, numerous variations alternate embodiments will occur to those skilled in the art. Accordingly, it is intended that the invention be limited only in terms of the appended claims.

What is claimed is:

1. A fault detection system for a satellite communications system comprising:
   a control center;
   a satellite having a payload having a plurality of paths therethrough;
   a system ground station generating a diagnostic message corresponding to at least one of said plurality of paths, said system ground station transmitting the diagnostic message to the payload,
   said payload generating a response signal and transmitting the response signal to the control center,
   said control center generating a fault signal indicative of a location of a fault within the payload.

2. A fault detection system as recited in claim 1 further comprising a plurality of switches and electronic component strings.

3. A fault detection system as recited in claim 2 wherein said plurality of switches and electronic component strings define said plurality of paths through said payload.

4. A fault detection system as recited in claim 1 wherein said payload further comprises signal or data injection points.

5. A method for detecting a fault in a satellite communications system having a satellite with a spacecraft payload having a plurality of paths therethrough comprising the steps of:
   generating a diagnostic message at system ground stations, said diagnostic message having a predetermined path characteristic relative to at least one of the plurality of paths of the spacecraft payload;
   transmitting the diagnostic message to the spacecraft payload;
   generating a response signal in the payload in response to the diagnostic message;
   transmitting the response signal to a network control center;
   comparing the response signal to a predetermined response; and,
   when the response signal is missing or is different from the predetermined response, generating a fault signal indicative of the location of the fault within the payload.

6. A method as recited in claim 5 further comprising the step of injecting a tracer message into the payload.

7. A method as recited in claim 6 wherein the step of injecting a tracer message comprises the steps of injecting a tracer message at a switch of the payload.

8. A method as recited in claim 7 further comprising the step of comparing the tracer message to a predetermined tracer message.

9. A method as recited in claim 5 wherein the step of generating a diagnostic message comprises the step of generating a plurality of diagnostic messages, each of said plurality of diagnostic messages corresponding to a respective one of the plurality of paths.

10. A method for detecting a fault in a satellite communications system having a satellite with a spacecraft payload having a plurality of paths therethrough comprising the steps of:
   generating a diagnostic message at a system ground station, said diagnostic message having a predetermined path characteristic relative to the spacecraft payload;
   transmitting the diagnostic message to the spacecraft;
   routing the diagnostic signal through the payload along a predetermined path in response to the diagnostic signal;
   generating a response signal in the payload in response to the diagnostic message;
   transmitting the response signal to a network control center;
   comparing the response signal to a predetermined response; and
   when the response signal is different than the predetermined response, generating a fault signal indicative of a location of the fault within the payload.

11. A method as recited in claim 10 further comprising the step of injecting a tracer message into the payload.

12. A method as recited in claim 11 wherein the step of injecting a tracer message comprises the steps of injecting a tracer message at a switch of the payload.

13. A method as recited in claim 12 further comprising the step of comparing the tracer message to a predetermined tracer message.

14. A method as recited in claim 10 wherein the step of generating a diagnostic message comprises the step of generating a plurality of diagnostic messages, each of said plurality of diagnostic messages corresponding to a respective one of the plurality of paths.

* * * * *